United States Patent
Byrne et al.

(10) Patent No.: US 10,070,736 B2
(45) Date of Patent: Sep. 11, 2018

(54) INTEGRATED WIRELESS ALERT SYSTEM

(71) Applicants: Norman R. Byrne, Ada, MI (US); Timothy J. Warwick, Sparta, MI (US); Robert Craig Klem, Rockford, MI (US)

(72) Inventors: Norman R. Byrne, Ada, MI (US); Timothy J. Warwick, Sparta, MI (US); Robert Craig Klem, Rockford, MI (US)

(*) Notice: Subject to any disclaimer, the term of this patent is extended or adjusted under 35 U.S.C. 154(b) by 0 days.

(21) Appl. No.: 15/643,992

(22) Filed: Jul. 7, 2017

(65) Prior Publication Data

US 2018/0008051 A1  Jan. 11, 2018

Related U.S. Application Data

(60) Provisional application No. 62/360,261, filed on Jul. 8, 2016.

(51) Int. Cl.
| | |
|---|---|
| A47C 31/00 | (2006.01) |
| G08C 17/02 | (2006.01) |
| A47B 95/00 | (2006.01) |
| A47B 97/00 | (2006.01) |
| H04Q 9/00 | (2006.01) |

(52) U.S. Cl.
CPC ............ *A47C 31/008* (2013.01); *A47B 95/00* (2013.01); *A47B 97/00* (2013.01); *G08C 17/02* (2013.01); *H04Q 9/00* (2013.01); *G08C 2201/20* (2013.01); *G08C 2201/50* (2013.01); *H04Q 2209/43* (2013.01); *H04Q 2209/823* (2013.01)

(58) Field of Classification Search
CPC ........ A47C 31/008; A47B 95/00; A47B 97/00
USPC .................................................. 340/7.4–7.45
See application file for complete search history.

(56) References Cited

U.S. PATENT DOCUMENTS

| | | |
|---|---|---|
| 6,181,237 B1 | 1/2001 | Gehlot |
| 6,249,222 B1 | 6/2001 | Gehlot |
| 6,344,795 B1 | 2/2002 | Gehlot |
| 6,607,484 B2 | 8/2003 | Suzuki et al. |
| 7,016,707 B2 | 3/2006 | Fujisawa et al. |
| 8,480,429 B2 | 7/2013 | Byrne |
| 8,482,252 B2 | 7/2013 | Byrne |
| 8,558,665 B2 | 10/2013 | Um et al. |
| 9,300,347 B1 | 3/2016 | Coverstone |

(Continued)

*Primary Examiner* — Allen T Cao
(74) *Attorney, Agent, or Firm* — Gardner, Linn, Burkhart & Ondersma, LLP

(57) ABSTRACT

An alert system includes an audio speaker or video display, and a communications unit. The communications unit is retained and supported by a power and data unit, and is configured to access data sources that include at least one of schedule information, environmental information, news reports, fire/police alerts, weather statements/information, and user-specific information, and to communicate with the audio speaker based upon the accessed data sources. The communications unit is configured to network with a computing device associated with a first user. The communications unit is configured to access the one or more data sources as defined by user-specific parameters associated with the first user. The first user is identified based upon a user ID associated with the networked computing device. The communications unit is configured to direct the audio speaker or the video display to issue an alert in response to the one or more accessed data sources.

21 Claims, 4 Drawing Sheets

(56) References Cited

U.S. PATENT DOCUMENTS

| | | |
|---|---|---|
| 9,312,673 B2 | 4/2016 | Byrne et al. |
| 9,852,599 B1 * | 12/2017 | Slavin .................... H04W 4/90 |
| 2005/0240346 A1 | 10/2005 | Lin |
| 2005/0280550 A1 | 12/2005 | Kurian et al. |
| 2006/0255963 A1 | 11/2006 | Thompson et al. |
| 2007/0049197 A1 | 3/2007 | Klein |
| 2007/0206629 A1 | 9/2007 | Choi |
| 2008/0293453 A1 | 11/2008 | Atlas et al. |
| 2009/0072955 A1 | 3/2009 | Cary |
| 2009/0097363 A1 | 4/2009 | Nyberg |
| 2009/0215501 A1 | 8/2009 | Kim |
| 2010/0022220 A1 | 1/2010 | Gupta et al. |
| 2011/0072083 A1 | 3/2011 | Suetsugu |
| 2011/0096138 A1 | 4/2011 | Grimshaw |
| 2012/0127637 A1 | 5/2012 | Byrne et al. |
| 2013/0176738 A1 | 7/2013 | Tinaphong et al. |
| 2013/0207778 A1 | 8/2013 | Neafsey et al. |
| 2013/0231161 A1 | 9/2013 | Hsu et al. |
| 2014/0002261 A1 | 1/2014 | Ashbrook et al. |
| 2014/0053185 A1 | 2/2014 | Bleacher et al. |
| 2014/0188485 A1 | 7/2014 | Kim et al. |
| 2014/0359712 A1 | 12/2014 | Takayama |
| 2015/0061842 A1 | 3/2015 | Yoon et al. |
| 2015/0110324 A1 | 4/2015 | Feng et al. |
| 2015/0145656 A1 | 5/2015 | Levesque et al. |
| 2015/0332580 A1 | 11/2015 | Bokhary |
| 2016/0112988 A1 | 4/2016 | Lee |
| 2016/0174347 A1 | 6/2016 | Parello et al. |
| 2016/0224064 A1 | 8/2016 | Fleisig |
| 2016/0300403 A1 | 10/2016 | Harter et al. |
| 2016/0300404 A1 | 10/2016 | Harter et al. |
| 2016/0300407 A1 | 10/2016 | Harter et al. |
| 2016/0309307 A1 | 10/2016 | Agarwal et al. |
| 2017/0038739 A1 | 2/2017 | Nakamura et al. |
| 2017/0251356 A1 | 8/2017 | Andrade et al. |
| 2017/0315828 A1 | 11/2017 | Byrne et al. |
| 2017/0316659 A1 | 11/2017 | Byrne et al. |
| 2017/0318609 A1 | 11/2017 | Byrne et al. |

* cited by examiner

INTEGRATED WIRELESS ALERT SYSTEM

CROSS REFERENCE TO RELATED APPLICATION

The present application claims the filing benefits of U.S. provisional application Ser. No. 62/360,261, filed Jul. 8, 2016, which is hereby incorporated by reference herein in its entirety.

FIELD OF THE INVENTION

The present invention relates to power and data units and wireless alert systems.

BACKGROUND OF THE INVENTION

Conventional power and data units provide a variety of interconnections and flexibility. Power and data units may be embedded into walls and integrated into and/or onto furniture, such as office furniture. These embedded and integrated power and data units typically include outlets or other similar ports arranged into receptacles for mounting into the power and data channel units. Example outlets and ports include high voltage AC outlets, phone ports, low-voltage DC outlets, and electronic data outlets such as USB ports, and their respective assemblies, housings, or housing units.

SUMMARY OF THE INVENTION

The present invention provides a wireless alert system that is integrated into a power and/or data unit in a work area, and which provides user-specific alerts, such as in audible or visual form, regarding events such as upcoming meetings in the user's schedule. The system may further provide information that is useful to the user, such as news information, weather, and emergency alerts, and may facilitate communications with others such as by connecting the user with service providers on request. Optionally, the system may communicate with nearby sensors to further enhance the system's capabilities, such as by providing information regarding air temperature and quality, ambient sound levels, occupancy levels, and the like. The system utilizes software and wireless communications protocols to communicate with computing devices associated with a particular user and, optionally, with local sensors and/or data sources, such as using Bluetooth, NFC, or Wi-Fi communications protocols, for example.

In one form of the present invention, an exemplary integrated alert system includes a housing body, an audio speaker, and a communications unit. The housing body is configured for mounting to a work surface in a work area. The communications unit is retained and supported by the housing body, and is configured to access one or more data sources that include at least one of schedule information, environmental information, news reports, fire/police (emergency) alerts, weather statements and information, and user-specific information, and to communicate with the audio speaker based upon the accessed data sources. The communications unit is configured to network with a computing device associated with a first user. The communications unit is configured to access the one or more data sources as defined by user-specific parameters associated with the first user. The first user is identified based upon a user ID associated with the networked computing device. The communications unit is further configured to direct the audio speaker to issue an audible alert in response to the one or more accessed data sources.

In another form of the present invention, a method is provided for directing audible alerts to a user within a work area. The method includes positioning a portable computing device, associated with a first user, within network range of a communications unit that is mounted in the work area. The portable computing device is networked with the communications unit. The communications unit is networked with one or more data sources that include at least one of schedule information, environmental information, news reports, fire/police (emergency) alerts, weather statements and information, and user-specific information. The audio speaker is networked to the communications unit. The communications unit selects at least one data source of the one or more data sources as defined by user-specific parameters associated with the first user. The first user is identified based upon a user ID associated with the networked computing device. An alert signal is generated at the communications unit in response to the selected one or more data sources. The alert signal is transmitted to the audio speaker. An audible alert signal is generated at the audio speaker in response to the alert signal.

According to one aspect, the electronic device assembly may be wirelessly linked to at least one sensor. Exemplary wireless links include one or more of Bluetooth, near field communications (NFC), and Wi-Fi networks. Other wireless communications protocols may also be utilized. Exemplary sensors provide one or more of air temperature and quality, ambient sound levels, and occupancy levels.

Therefore, the wireless alert system interfaces with a user's personal electronic device when that device is within range of the wireless alert system, in order to provide the user with information that is at least partially tailored to that user in that area.

These and other objects, advantages, purposes and features of the present invention will become apparent upon review of the following specification in conjunction with the drawings.

DESCRIPTION OF THE PREFERRED EMBODIMENTS

Figure 1:
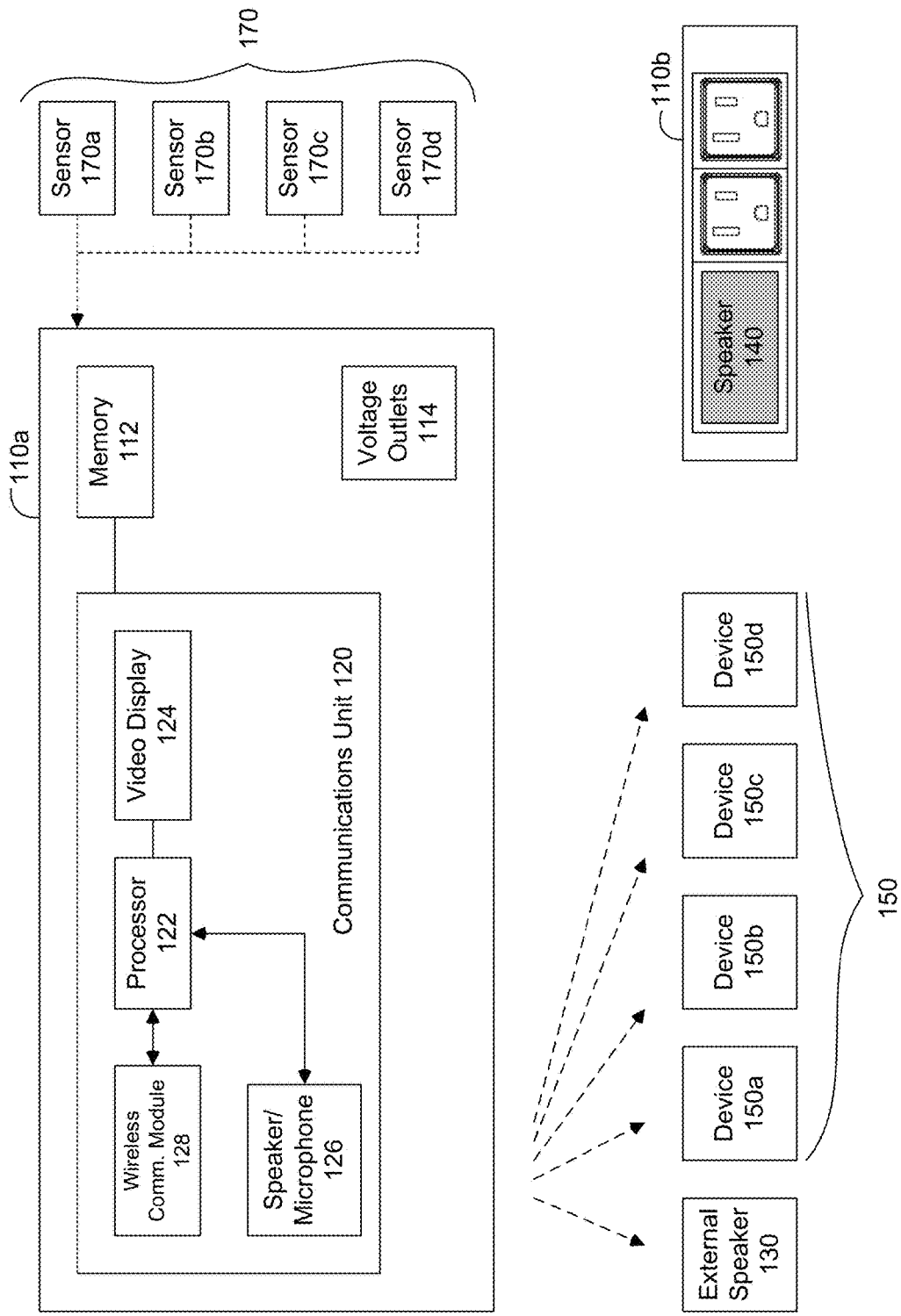
FIG. 1 is a block diagram illustrating a wireless alert system, in accordance with the present invention.
Figure 2:
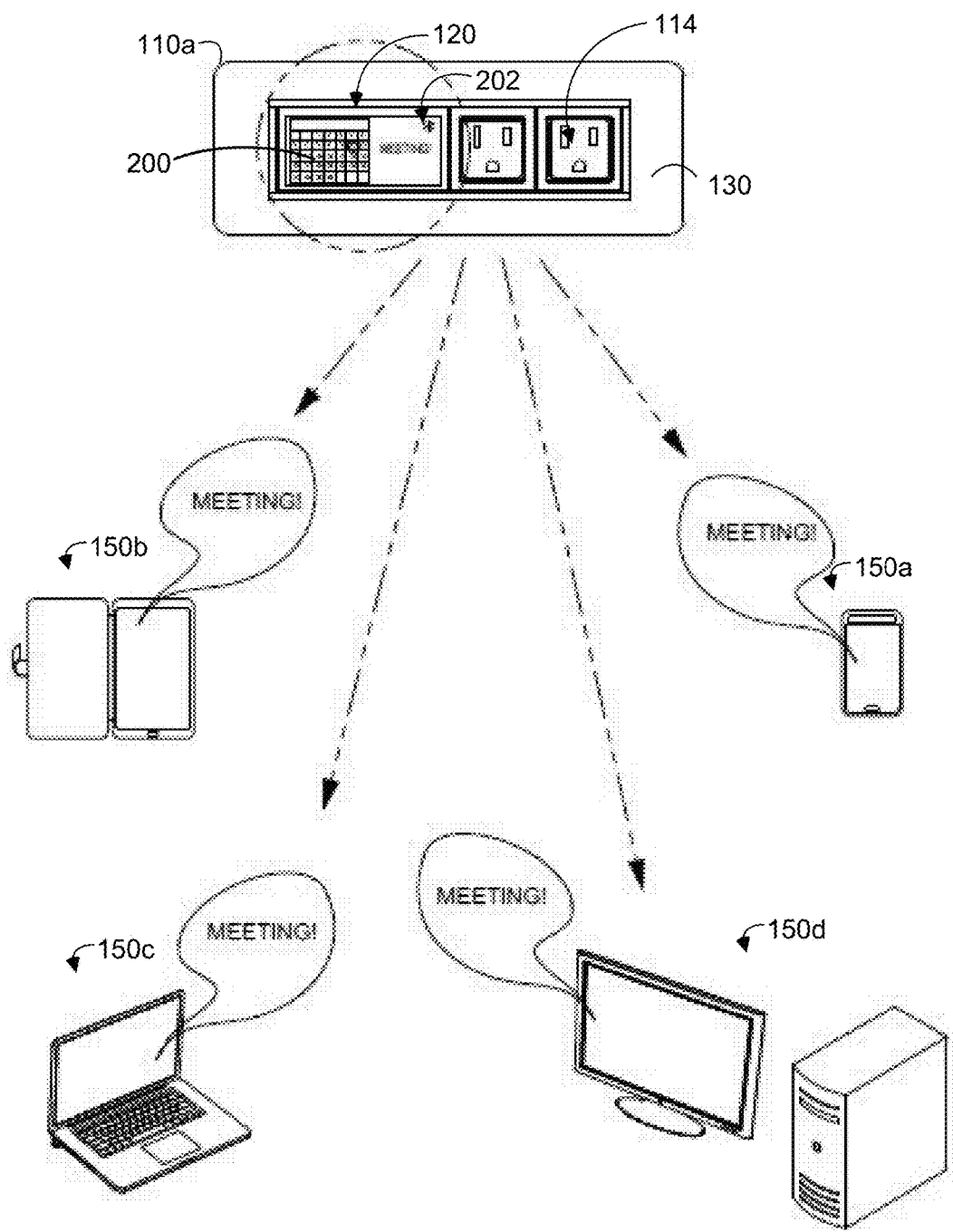
FIG. 2 is a diagrammatic view of a wireless alert system integrated into a power and/or data unit configured for mounting in a work area, in accordance with the present invention.

Referring now to the drawings and the illustrative embodiments depicted therein, an integrated wireless alert system is typically embodied as an electronic device incorporated into (or mounted in) a work area, and provides audible alerts (e.g., computer-generated voice messages) to a selected set of one or more portable electronic devices with which the mounted electronic device is electronically linked, such as to provide audible meeting alerts or the like. In one embodiment, a wireless alert system is incorporated into a power and data unit 110a configured for mounting in a work area, such as at or along a table or desk, in a wall or modular wall or divider, or the like (FIGS. 1 and 2). It will be appreciated that "work area" can refer to substantially any environment where work or communications tasks are conducted, including (but not necessarily limited to) hotel rooms, vehicle including personal vehicles and public transit vehicles, transportation centers or stations, residences, and the like.

Figure 4:
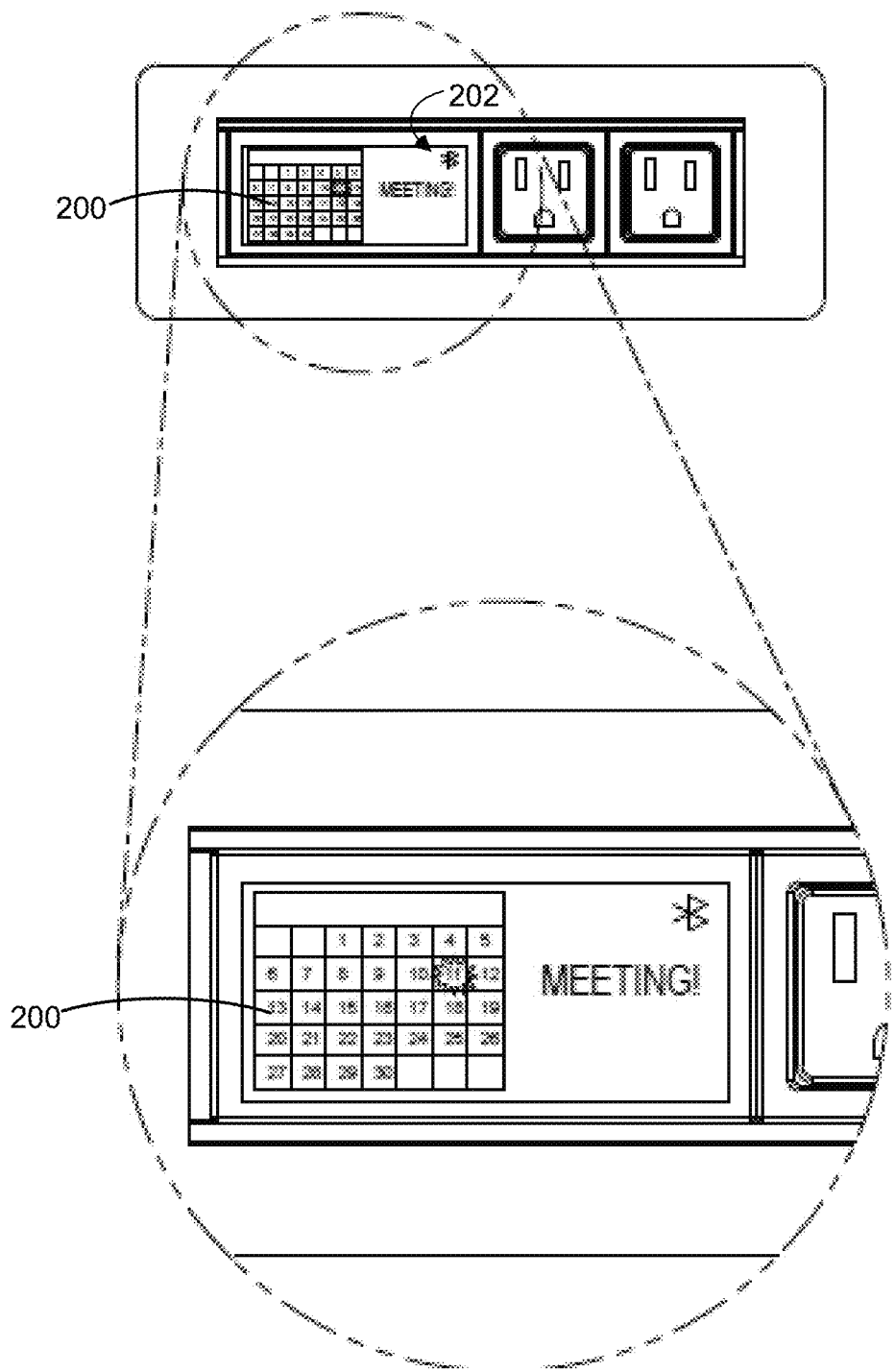
FIG. 4 is a top plan view of the power and/or data unit of FIG. 2, including an enlarged view of a display screen thereof.

In the illustrated embodiment of FIGS. 1, 2, and 4, the power and data unit 110a includes a communications unit 120 comprising a computer processor 122 with wired or wireless access to a memory module 112, such as an on-board memory 112 contained in the power and data unit 110a or a remote memory provided by a remote or "cloud" server. Optionally, the communications unit 120 further comprises a video display screen 124. In the illustrated embodiment, power and data unit 110a further includes one or more electrical power outlets 114 adjacent the communications unit 120, and a bezel or frame 130. The communications unit 120 may further include its own audio speaker and/or microphone 126, such as in a manner that is more fully described in co-pending and commonly-owned U.S. patent application Ser. No. 15/583,372, filed May 1, 2017, entitled "WIRELESS COMMUNICATIONS MODULE FOR WORK SURFACE POWER AND DATA UNITS," which is hereby incorporated herein by reference in its entirety. Moreover, the communications unit 120 may include display, processing, and wireless communications capabilities like those described in co-pending and commonly-owned U.S. patent application Ser. No. 15/499,301, filed Apr. 27, 2017, entitled "INFORMATION DISPLAY AND CONTROL FOR WORK AREAS," which is hereby incorporated herein by reference in its entirety.

Communications unit 120 further comprises a wireless communications module 128, which may use any one or more wireless communications protocols, which includes for example, Bluetooth protocol, near field communication (NFC) protocol, and Wi-Fi protocol. Other protocols not listed here, but which provide similar wireless communications, are also considered to be within the scope of this disclosure. An exemplary wireless communication protocol is preferably able to communicate with other portable devices 150 that are located within about one or two meters of communications unit 120, and optionally five or ten meters away, or more. More preferably, an exemplary communication protocol is able to communicate with other portable devices 150 that are located within network reach.

Figure 3:
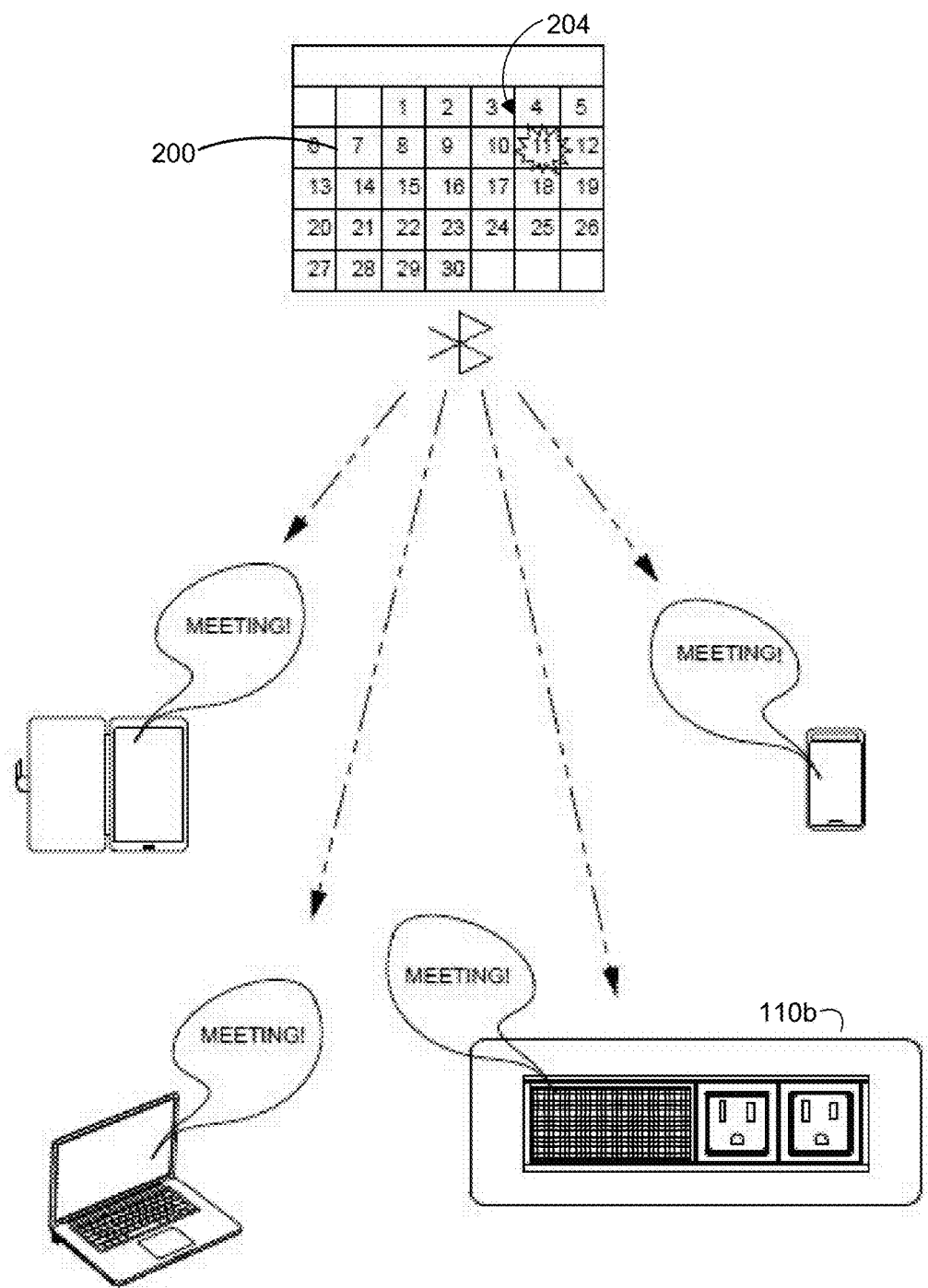
FIG. 3 is a diagrammatic view of another wireless alert system configured for sending audio alert messages to devices in a work area.

Communications unit 120 communicates wirelessly with portable or fixed-location devices 150, which may include smartphones 150a, tablet computers 150b, laptop computers 150c, desktop computers 150d (which are collectively referred to as device 150) (FIGS. 1 and 2), or another power and/or data unit 110b with wireless communications capability (FIG. 3). Communications unit 120 may be configured to establish a wireless network connection with substantially any portable electronic device capable of compatible wireless communications, such as any of the portable devices 150 and the power and data unit 110b described above, or a wearable device (e.g., a smart watch), when that device is positioned within network range of the communications unit 120. During a network connection, the communications unit 120 identifies a user associated with the networked device 150 (for example, with a user ID for a particular user), and is then capable of sending messages such as audible alerts to each other device 150 according to the associated user's personal electronically-stored schedule that is accessible to the communications unit 120. It is envisioned that the user can configure the type or nature of the alerts received from communications unit 120, such as to provide advance reminders and at what time intervals, etc. Optionally, the communications unit 120 and software may be capable of simultaneously networking with multiple devices (such as portable devices 150a-d) associated with different users and their corresponding user IDs.

When the communications unit 120 is equipped with an audio speaker 126, or is connected with a separate (e.g., Bluetooth enabled) audio speaker 130 such as may be associated with a computing device 150 or another power and/or data unit 110b, or with a separate power and/or data unit, such as described in the above-referenced U.S. patent application Ser. No. 15/583,372, and a user carrying a portable device 150 comes within range, communications unit 120 may automatically identify that device 150 and optionally send an audible message to the audio speaker 126 of the communications unit 120, or to the separate audio speaker 130, or to the portable device 150 associated with that user. Optionally, the user may adjust a preference setting to determine which audio speaker broadcasts audible messages.

Once the communications unit 120 is wirelessly connected and networked with a device 150 associated with a particular user, an audio message may be broadcast, such as a verbal personalized welcome message, an offer to retrieve information such as electronic news feeds (the content of which may be customized by the user), an offer to place an order for food or beverage from a nearby vending machine or cafeteria or merchant, a summary of upcoming events or appointments in the user's electronically stored schedule, and the like. The user selects which (if any) options are desired, either by verbal request (i.e., using voice recognition software) or by selecting the desired options on a user interface on their device 150, for example.

The communications unit 120 may also incorporate (or may be in communication with) nearby sensors 170, such as occupancy sensors 170a that can advise a user how many workstations are available or occupied, a temperature sensor 170b to display ambient temperature in that vicinity, an air quality sensor 170c, or an audio sensor 170d to display ambient sound levels and frequencies (these sensors are collectively referred to as sensor 170) (FIG. 1). Optionally, the communications unit 120 may offer some level of environmental control to the user, such as activating a white noise or sound-cancelling audio broadcast into the work area. Optionally, an occupancy sensor 170a-d associated with the communications unit 120 may be used to trigger wireless networking between the communications unit 120 and the particular device 150 associated with the user.

Once the communications unit 120 is wirelessly networked with one or more devices 150a-d associated with one or more users, the unit 120 is capable of transmitting or "pushing" audio and/or video and/or sensory (e.g., vibration) alerts to a selected one or more of the devices 150a-d, such as when the users associated with the devices 150a-d have an upcoming meeting or other event in their schedules, which schedules are accessible to the communications unit 120. Thus, communications unit 120 is capable of sending audio or other types of alerts to an appropriate subset of users according to their respective schedules and personal settings.

It should be appreciated that video display screen 124 is an optional feature of the communications unit 120, which can be used to display a calendar 200 as shown in FIGS. 2-4

(which may be customized according to a particular user's preferences), and may also display a network status indication using a status indicia 202 (FIGS. 2 and 4). Display screen 124 may provide visual alerts 204, such as to accompany audible alerts including verbal (voice) messages (FIG. 3). Display screen 124 may be an interactive touchscreen device, and may be highly configurable according to the preferences of a particular user who has wirelessly connected their device 150 to the communications unit 120. It will further be appreciated that communications unit 120 may provide additional types of functionality and information display, such as is more fully described in the above-referenced U.S. patent application Ser. No. 15/499,301. Communications unit 120 may also provide a user status display capability, such as described in U.S. provisional applications Ser. Nos. 62/330,386 and 62/342,385, filed May 2, 2016 and May 27, 2016, respectively, and both entitled WIRELESS STATUS INDICATOR LIGHT, which are hereby incorporated herein by reference in their entireties.

In order to provide the audio and video alerting capability described herein, a software application is run by the communications unit 120 and/or compatible devices 150a-d. It will be appreciated that the software application may be run by one or more of the devices 150a-d, which wirelessly connects to an audio speaker, such as Bluetooth-enabled speaker 140 which is associated with another power and/or data unit 110b (FIG. 1). Once a user's device 150 is wirelessly networked with the communications unit 120 and an associated audio speaker (such as speaker 130 or speaker 140), the speaker 130,140 may broadcast audible alerts for only that user, such as based on that user's electronically stored schedule data and personal preferences.

The software application facilitates communication with computer databases that store a variety of information, such as personal calendar records, personal preferences, and user-specific content. The software application also facilitates communication with available sensors 170a-d such as air temperature, humidity, and quality, sound level sensors, occupancy sensors, and the like. The software application may further communicate via the Internet and with other data sources, to provide user-specific information, general information, announcements, news reports, and emergency alerts (e.g., fire or tornado). For example, communications unit 120 may broadcast an audio and visual emergency alert only if an occupancy sensor detects a user present in the vicinity, while the communications unit 120 is running the software and is in communication with the occupancy sensor 170 while also being networked with the user's device 150. The communications unit 120 may also broadcast an audio message based upon content received from the Internet, other data sources, and/or connected sensors for a specific user when that user's device 150 is networked to the communications unit 120. For example, a communications unit 120 in a work space of a hotel room or office space may broadcast an audio message that was left for a particular user when that user is present, as determined by the user's device 150 wirelessly connecting with the communications unit 120. In a further example, the communications unit 120 may broadcast an audio message providing information acquired from the Internet, other data sources, a local memory, and/or connected sensors 170a-d, to a user when that user's device 150 is wirelessly connected with the communications unit 120.

Thus, the integrated wireless alert system of the present invention provides user-specific audible and/or visual alerts to a user who, with their compatible and networked device 150, is in the vicinity of a communications unit 120, such as may be associated with a power and/or data unit 110a in a work area. The system, once networked, provides user-specific alerts, such as for events such as upcoming meetings in the user's schedule that is accessible to the system. The system may provide additional useful functions to a user, such as news, weather, and emergency alerts. By interfacing with nearby sensors 170, the system's capabilities are further enhanced, such as by providing highly localized information regarding environmental factors, and optionally providing some level of control over environmental factors in a work area. The system utilizes software and wireless communications protocols to communicate with and manage computing devices and, optionally, to communicate with local sensors and/or data sources.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. An integrated alert system comprises:
 a power and data unit configured for mounting to a work surface in a work area;
 an audio speaker or a video display; and
 a communications unit retained and supported by a housing body, the communications unit configured to access one or more data sources that include at least one of schedule information, environmental information, news reports, fire/police alerts, weather statements/information, and user-specific information, and to communicate with the audio speaker based upon the accessed data sources;
 wherein the communications unit is configured to network with a computing device associated with a first user, wherein the communications unit is configured to access the one or more data sources as defined by user-specific parameters associated with the first user, wherein the first user is identified based upon a user ID associated with the networked computing device; and
 wherein the communications unit is configured to direct the audio speaker or the video display to issue an audible or visible alert in response to the one or more accessed data sources.

2. The integrated alert system of claim 1, wherein the communications unit is configured to wirelessly network with the audio speaker or the video display.

3. The integrated alert system of claim 1, wherein the communications unit comprises a processor and a software application that is executable by the processor.

4. The integrated alert system of claim 1, wherein the video display comprises an interactive display screen that is touch-sensitive.

5. The integrated alert system of claim 1 further comprising an environmental sensor networked with the communications unit, wherein the environmental sensor comprises at least one of: an occupancy sensor, a temperature sensor, a humidity sensor, an air quality sensor, and a sound level sensor.

6. The integrated alert system of claim 1, wherein the communications unit is configured to communicate with a data source that is a remote electronic data source.

7. The integrated alert system of claim 1, wherein at least one of the data sources is further associated with a second user, and wherein the communications unit is configured to network with a second computing device associated with the second user, wherein the second user is identified based upon a user ID associated with the second computing device, and wherein the communications unit is configured to access the one or more data sources as defined by user-specific parameters associated with the second user, and to direct the audio speaker or video display to issue an audible or visible alert in response to one or more selected data sources.

8. A method for directing an alert signal to a user within a work area, said method comprising:
positioning a portable computing device, associated with a first user, within network range of a communications unit that is mounted in a work area;
networking the portable computing device with the communications unit;
networking the communications unit with one or more data sources that include at least one of schedule information, environmental information, news reports, fire/police alerts, weather statements/information, and user-specific information;
networking an audio speaker or a video display to the communications unit;
selecting, with the communications unit, at least one data source of the one or more data sources as defined by user-specific parameters associated with the first user, wherein the first user is identified based upon a user ID associated with the networked computing device;
generating an alert signal at the communications unit in response to the selected one or more data sources;
transmitting the alert signal to the audio speaker or the video display; and
generating an audible alert at the audio speaker or a visual alert at the video display in response to the alert signal.

9. The method of claim 8, wherein the network range is a wireless network range.

10. The method of claim 8, wherein networking the portable computing device with the communications unit, and networking the audio speaker to the communications unit, both comprise wireless networking.

11. The method of claim 8, wherein networking the portable computing device with the communications unit comprises at least one of: (i) interacting with the portable computing device to network the portable computing device to the communications unit, and (ii) interacting with the communications unit to network the portable computing device to the communications unit.

12. The method of claim 8 further comprising networking an environmental sensor with the communications unit, wherein the environmental sensor comprises at least one of: an occupancy sensor, a temperature sensor, a humidity sensor, an air quality sensor, and a sound level sensor.

13. The method of claim 12, wherein generating an alert signal at the communications unit is also in response to an input received from the environmental sensor networked with the communications unit.

14. The method of claim 8, wherein networking the portable computing device with the communications unit, and networking the audio speaker to the communications unit, both comprise interacting with a touch-sensitive interactive display screen.

15. The method of claim 8 further comprising networking the communications unit with a data source that is a remote electronic data source, such that the communications unit communicates with the remote electronic data source.

16. A power and data unit configured to support at least one electronic device, the power and data unit comprising:
a housing body configured for mounting to a work surface in a work area;
an audio speaker;
an environmental sensor; and
a communications unit retained and supported by the housing body, the communications unit configured to access one or more data sources that include at least one of schedule information, environmental information, news reports, fire/police alerts, weather statements/information, and user-specific information, and to communicate with the audio speaker based upon the accessed data sources;
wherein the communications unit is configured to network with a computing device associated with a first user, wherein the communications unit is configured to access the one or more data sources as defined by user-specific parameters associated with the first user, wherein the first user is identified based upon a user ID associated with the networked computing device;
wherein the communications unit is configured to network with the environmental sensor and to receive environmental information from the environmental sensor; and
wherein the communications unit is configured to direct the audio speaker to issue an audible alert in response to at least one of: (i) the one or more accessed data sources, and (ii) received environmental information.

17. The power and data housing assembly of claim 16, wherein the communications unit is configured to wirelessly network with the audio speaker.

18. The power and data housing assembly of claim 16, wherein the communications unit comprises a processor and a software application that is executable by the processor.

19. The power and data housing assembly of claim 16, wherein the communications unit further comprises an interactive display screen that is touch-sensitive.

20. The power and data housing assembly of claim 16, wherein the environmental sensor comprises at least one of: an occupancy sensor, a temperature sensor, a humidity sensor, an air quality sensor, and a sound level sensor.

21. The power and data housing assembly of claim 16, wherein the communications unit is configured to communicate with a data source that is a remote electronic data source.

* * * * *